United States Patent [19]

Shiraishi et al.

[11] Patent Number: 5,130,929
[45] Date of Patent: Jul. 14, 1992

[54] SYSTEM FOR PREVENTING EXCESSIVE SLIP OF DRIVE WHEEL OF VEHICLE

[75] Inventors: Shuji Shiraishi; Hironobu Kiryu; Osamu Yamamoto; Takashi Nishihara, all of Saitama, Japan

[73] Assignee: Honda Giken Kogyo Kabushiki Kaisha, Tokyo, Japan

[21] Appl. No.: 551,988

[22] Filed: Jul. 12, 1990

[30] Foreign Application Priority Data

Jul. 13, 1989 [JP] Japan .................. 1-82374[U]

[51] Int. Cl.$^5$ ............................. B60T 13/68
[52] U.S. Cl. .................. 364/426.03; 180/197
[58] Field of Search .......... 364/426.01, 426.03, 364/426.02; 180/197

[56] References Cited

U.S. PATENT DOCUMENTS

| | | | |
|---|---|---|---|
| 4,480,309 | 10/1984 | Burckhardt et al. | 364/426.03 |
| 4,889,204 | 12/1989 | Furuga et al. | 180/197 |
| 4,946,015 | 8/1990 | Browalski et al. | 192/1.23 |
| 4,955,449 | 9/1990 | Hilburger et al. | 180/197 |
| 4,971,164 | 11/1990 | Fujita et al. | 180/197 |
| 5,024,285 | 6/1991 | Fujita | 180/197 |

Primary Examiner—Thomas G. Black
Attorney, Agent, or Firm—Armstrong & Kubovcik

[57] ABSTRACT

In a system for preventing an excessive slipping of a drive wheel of a vehicle, including a drive wheel torque decrement calculating means for calculating a drive wheel torque decrement in accordance with the slipping state of the drive wheel on the basis of a drive wheel velocity and a vehicle velocity, there is further includes a switchover means which produces a torque decrement switchover signal in accordance with a further large slipping of the drive wheel appearing during a given torque reduction control, and a torque decrement changeover means which delivers, to the drive wheel torque decrement calculating means, a correcting signal indicative of a command to reduce the degree of relation of the torque decrement to the slipping state of the drive wheel in accordance with an output of the torque decrement changeover signal from the switchover means, whereby it is possible to avoid a control hunting which may be caused by a larger slipping state of the drive wheel due to a disturbance factor.

4 Claims, 2 Drawing Sheets

SYSTEM FOR PREVENTING EXCESSIVE SLIP OF DRIVE WHEEL OF VEHICLE

BACKGROUND OF THE INVENTION

1. Field of the Invention

The field of the invention is a system for preventing an excessive slip of a drive wheel of a vehicle, including a drive wheel velocity detector means for detecting the velocity of the drive wheel, a vehicle velocity detector means for detecting a vehicle velocity, a drive wheel slip value calculating means for calculating a slip value of the drive wheel on the basis of the drive wheel velocity and the vehicle velocity, and a drive wheel torque decrement calculating means for calculating a drive wheel torque decrement in accordance with the slipping state of the drive wheel.

2. Description of the Prior Art

Systems of such type are conventionally known from, for example, Japanese Patent Application Laid-open No. 149250/88.

In such a known system, a PID control is carried out by use of, as a target drive wheel velocity, a drive wheel velocity corresponding to a predetermined slip rate (for example, of 10%) determined on the basis of a vehicle velocity. When the PID control is effected at a constant gain, a gain of a rapid feedback response, i.e., a relatively large gain is set so as to increase the performance of control in a region of a high frequency of use. Moreover, as a region of high frequency of use, a low speed stage of a speed reduction gear is generally selected.

However, various disturbances are encountered during a feedback control of the drive wheel velocity. Particularly when a gear shift is conducted during travelling of a vehicle on a road surface of a low friction coefficient, or when the condition of the road surface is changed from a snow-laden road to a frozen road, the drive wheel velocity may greatly exceed the target velocity in some cases due to a disturbing factor during the PID feedback control, and the resulting large velocity deviation may become a trigger to generate a control hunting.

SUMMARY OF THE INVENTION

The present invention has been accomplished with such circumstances in view, and it is an object of the present invention to provide a system for preventing an excessive slip of a drive wheel of a vehicle, wherein even if there is a large disturbing factor, the generation of any control hunting can be avoided.

According to a first feature of the present invention, the system includes a switchover means which produces a torque decrement switchover signal when the slip value of the drive wheel becomes larger than a preset value after the drive wheel has entered a predetermined slipping state, and a torque decrement changeover means which delivers, to the drive wheel torque decrement calculating means, a correcting signal indicative of a command to reduce a degree of relation of the drive wheel torque decrement with respect to the slipping state of the drive wheel in accordance with an output of the torque decrement changeover signal from the switchover means.

According to a second feature of the present invention, the drive wheel torque decrement calculating means includes a PID calculating means for calculating the drive wheel torque decrement on the basis of the slipping state of the drive wheel, and a gain switchover means is connected to the drive wheel torque decrement calculating means for switching a gain of the PID calculating means to a smaller value when a slip value of the drive wheel becomes larger than the preset value after the drive wheel has entered the predetermined slipping state.

With the above construction, when the slip value of the drive wheel becomes larger than the preset value after the drive wheel has entered the predetermined slipping state, the drive wheel torque decrement for the slipping state of the drive wheel is reduced by a judgment that a large disturbance has been applied. Therefore, it is possible to avoid the generation of any control hunting due to the large disturbance.

Further, according to a third feature of the present invention, the system further includes a torque decrement changeover means for reducing a degree of relation of the drive wheel torque decrement with respect to the slip value for a period from an instant when the slipping state of the drive wheel has become larger than a first slipping state to an instant of restoring to a second slipping state smaller than the first slip state.

With such construction, when the slip has become the first slipping state which is a larger slipping state, the amount of torque decrement of the drive wheel with respect to the slip value of the drive wheel is reduced from the decision that a disturbance has been applied and therefore, it is possible to avoid the generation of control hunting due to a large disturbance.

The above and other objects, features and advantages of the invention will become apparent from a reading of the following description of the preferred embodiment, taken in conjunction with the accompanying drawings.

BRIEF DESCRIPTION OF THE DRAWINGS

Drawings illustrate one embodiment of the present invention, wherein.

DESCRIPTION OF THE PREFERRED EMBODIMENT

Figure 1:
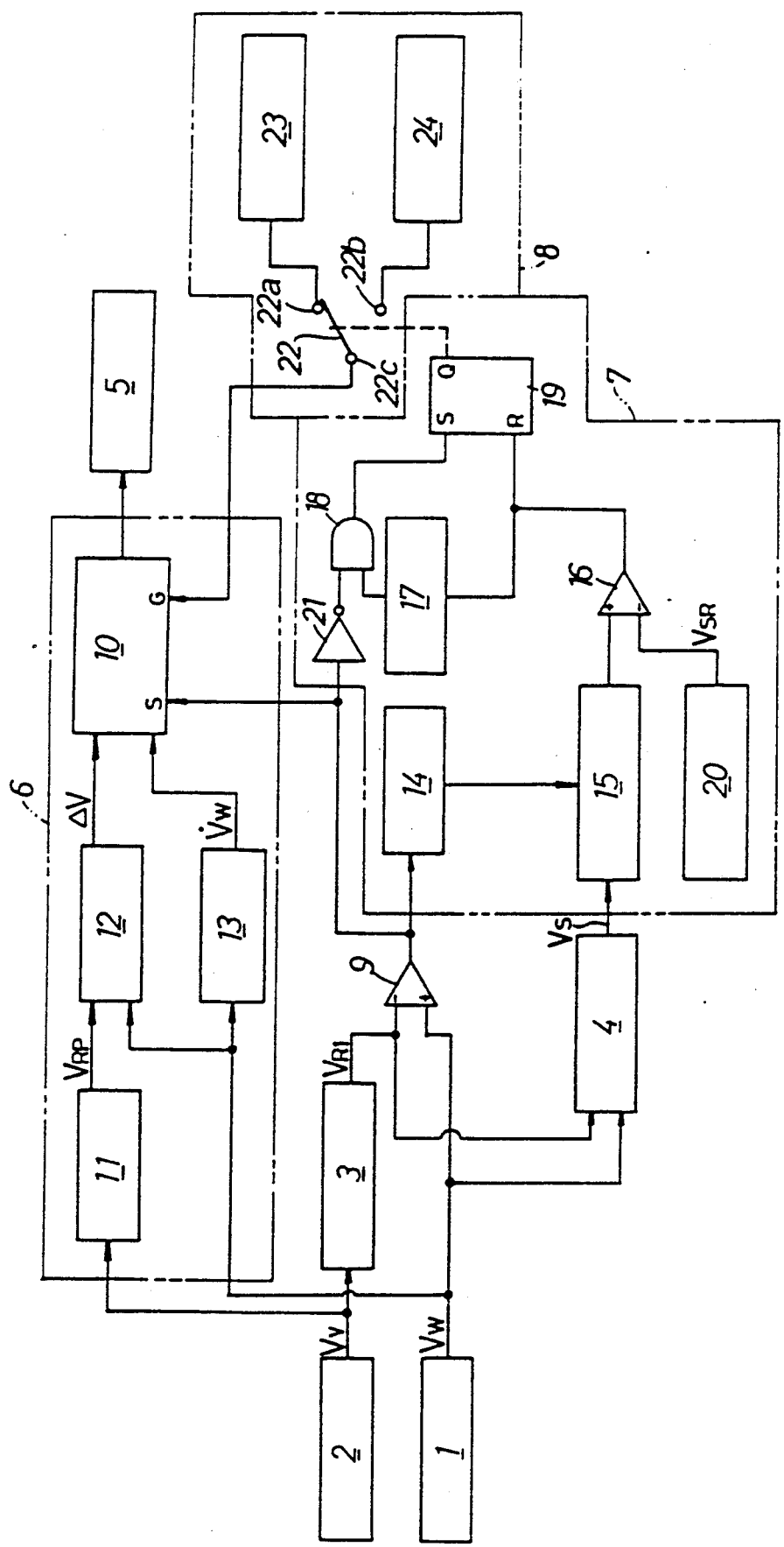
FIG. 1 is a block circuit diagram illustrating the arrangement of a system according to the embodiment.

The present invention will now be described with reference to the accompanying drawings by way of one embodiment in which the present invention is applied to a front engine and front drive vehicle. First referring to FIG. 1, a system for preventing an excessive slip of a drive wheel according to this embodiment comprises a drive wheel velocity detector means 1 for detecting the velocity $V_w$ of a drive wheel which is a front wheel, a driven wheel velocity detector means 2 as a vehicle velocity detector means for detecting the velocity $V_v$ of a driven wheel, which is a rear wheel, as a vehicle velocity, an acceptable velocity calculating means 3 for calculating a control-acceptable velocity on the basis of the driven wheel velocity $V_v$, a drive wheel slip value calculating means 4 for calculating the slip value $V_s$ of the drive wheel on the basis of the drive wheel velocity $V_w$ and the driven wheel velocity $V_v$, and a drive wheel torque decrement calculating means 6 for calculating a drive wheel torque decrement according to the slip of the drive wheel to carry out a PID feedback control of a drive wheel torque reducing means 5. This system further includes a switchover means 7 which produces a torque decrement switchover signal when the drive wheel slip value is larger than a preset value after lapse of a predetermined time from when the drive wheel has become a predetermined slipping state, and a torque decrement changeover means 8 which produces a correcting signal indicative of a command to reduce the gain of the drive wheel torque decrement calculating means 6 in order to reduce the degree of relation of the drive wheel torque decrement to the slipping state of the drive wheel in accordance with the output of a torque decrement switchover signal from the switchover means 7.

The drive wheel velocity detector means 1 produces an average value of both the drive wheel velocities or a high select value thereof when both the drive wheels are collectively controlled, or a velocity of the drive wheel which is an object to be controlled, when the drive wheels are independently controlled. The detected value Vw from the drive wheel velocity detecting means 1 is inputted to a non-inverted input terminal of a comparator circuit 9 and the drive wheel torque decrement calculating means 6. The driven wheel velocity detector means 2 produces an average value of the left and right driven wheel velocities or a high select value thereof and the detected value Vv from the driven wheel velocity detector means 2 is inputted to the acceptable velocity calculating means 3 and the driven wheel torque decrement calculating means 6.

The control-acceptable velocity calculating means 3 calculates a control-acceptable velocity $V_{R1}$ according to an expression $V_{R1}=Vv\times K_1$, wherein $K_1$ is a constant, on the basis of the inputted driven wheel velocity Vv, and the control-acceptable velocity $V_{R1}$ is set in correspondence to a drive wheel velocity at the instant when the slip rate of the drive wheel is, for example, of 3%. The output signal from the control-acceptable velocity calculating means 3 is inputted to an inverted input terminal of the comparator circuit 9 which produces a higher level signal in response to the drive wheel velocity Vw detected in the drive wheel velocity detector means 1 exceeding the control-acceptable velocity $V_{R1}$ calculated in the acceptable velocity calculating means 3. The output signal from the comparator circuit 9 is received in the switchover means 7 and the drive wheel torque decrement calculating means 6.

The drive wheel slip value calculating means 4 calculates a slip value Vs indicative of the slipping state of the drive wheel from the control-acceptable velocity $V_{R1}$ given in the acceptable velocity calculating means 3 on the basis of the driven wheel velocity Vv and from the drive wheel velocity Vw. The calculation according to an expression $Vs=Vw-V_{R1}$ is effected in the drive wheel slip value calculating means 4.

The drive wheel torque reducing means 5 used may be, for example, a means for varying the amount of fuel supplied to an engine carried in the vehicle, or a means for controlling the throttle opening degree between an accelerator pedal opening degree and an idle opening degree, or a means for varying the number of cylinders to which the supply of fuel is cut off.

Figure 2:
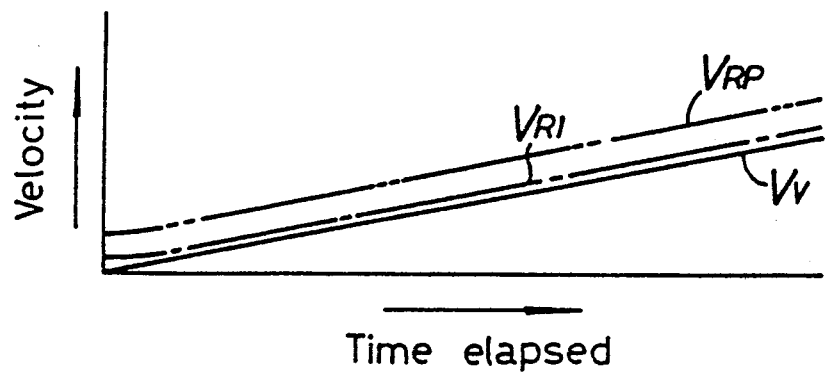
FIG. 2 is a graph illustrating a relationship of the target drive wheel velocity and the control-acceptable velocity to the vehicle velocity.

The drive wheel torque decrement calculating means 6 comprises a PID calculating circuit 10, a target velocity determining circuit 11, a subtraction circuit 12, and a differentiating circuit 13. The PID calculating circuit 10 performs a PID calculation by use of a gain inputted to a gain input terminal G thereof and delivers a PID calculated value as a control signal into the torque reducing means 5. When the output from the comparator circuit 9 connected to a start signal input terminal S of the PID calculating circuit 10 is at a high level, i.e., when the drive wheel velocity Vw has exceeded the control-acceptable velocity $V_{R1}$, the calculation is started, and when the output from the comparator circuit 9 is at a low level, i.e., when the drive wheel velocity Vw is lower than the control-acceptable velocity $V_{R1}$, the calculation is stopped. The target velocity determining circuit 11 determines a target wheel velocity $V_{RP}$ for the feedback control according to an expression $V_{RP}=Vv\times K_2$ (wherein $K_2$ is a constant) on the basis of the inputted driven wheel velocity Vv, and the target wheel velocity $V_{RP}$ is set in correspondence to a drive wheel velocity at the time when the slip rate of the drive wheel is, for example, 7%. The target wheel velocity $V_{RP}$ is set larger than the control-acceptable velocity $V_{R1}$, as shown in FIG. 2.

The target wheel velocity $V_{RP}$ given in the target velocity determining circuit 11 is inputted into the subtraction circuit 12 in which a deviation $\Delta V$ ($=V_{RP}-Vw$) between the target wheel velocity $V_{RP}$ and the drive wheel velocity Vw is obtained. The deviation $\Delta V$ is inputted into the PID calculating circuit 10. Further, a differentiated value Vw of the inputted drive wheel velocity Vw is calculated in the differentiating circuit 13 and inputted as a differential term into the PID calculating circuit 10.

The switchover means 7 comprises a first timer 14 connected to the comparator circuit 9, a hold circuit 15 which is connected to the drive wheel slip value calculating means 4 and to which an output signal from the first timer 14 is inputted, a comparator circuit 16, a second timer 17 to which an output from the comparator circuit 16 is inputted, an AND circuit 18, and a flip-flop 19.

The first timer 14 produces a high level signal after lapse of a predetermined time T1, e.g., 0.5 seconds from an instant when the output from the comparator circuit 9 has become a high level. The hold circuit 15 holds the slip value Vs received from the drive wheel slip value calculating means 4 when the it receives the high level signal from the first timer 14. The hold circuit 15 is connected to a non-inverted input terminal of the comparator circuit 16, and a threshold value $V_{SR}$ determined in a threshold value determining circuit 20 is inputted to an inverted input terminal of the comparator 16. Therefore, the comparator circuit 16 produces a high level signal in response to the slip value Vs exceeding the threshold value $V_{SR}$.

The second timer 17 outputs a high level signal after lapse of a predetermined time T2, e.g., 5 seconds from an instant when the output from the comparator circuit 16 has become a high level, and the output from the second timer 17 is applied to one of input terminals in the AND circuit 18. The output from the comparator circuit 9 is inverted in an inverting circuit 21 and applied to the other input terminal of the AND circuit 18. Thus, the AND circuit 18 outputs a high level signal in response to the output from the comparator 9 becoming a low level, i.e., the drive wheel velocity Vw becoming equal to or less than the control-acceptable velocity $V_{R1}$ after lapse of the predetermined time T2 from the instant when the slip value Vs has exceeded the threshold value $V_{SR}$.

The flip-flop 19 is an RS flip-flop, having a set input terminal to which the output from the AND circuit 18 is applied, and a reset input terminal to which the output from the comparator circuit 16 is applied.

The torque decrement changeover means 8 comprises a switch 22, a higher gain determining circuit 23, and a lower gain determining circuit 24. The switch 22 comprises a separate contact 22a connected to the higher gain determining circuit 23, a separate contact 22b connected to the lower gain determining circuit 24, and a common contact 22c connected to the gain input terminal G of the PID calculating circuit 10 in the drive wheel torque decrement calculating means. When an output from the flip-flop 19 is high, the switch 22 is in a switching mode in which the separate contact 22a is electrically connected to the common contact 22c, whereas when the output from the flip-flop 19 has become low, the switch 22 is brought into a switching mode in which the seperate contact 22b is electrically connected to the common contact 22c.

A gain to be inputted to the gain input terminal G of the PID calculating circuit 10 is prepared in the higher gain determining circuit 23 at a relatively high value, i.e., at a value for relatively increasing the drive wheel torque decrement with respect to the slipping state of the drive wheel. On the other hand, another gain to be inputted to the gain input terminal G of the PID calculating circuit 10 is prepared in the lower gain determining circuit 24 at a lower value than that in the higher gain determining circuit 23, i.e., at a value for relatively reducing the drive wheel torque decrement with respect to the slipping state of the drive wheel.

The operation of this embodiment will be described below. When the drive wheel velocity Vw has exceeded the control-acceptable velocity $V_{R1}$ during travelling of the vehicle, the output from the comparator circuit 9 becomes high and in response to this, the PID feedback control by the drive wheel torque decrement calculating means 6 is started, and the drive torque reducing means 5 is operated so as to converge the drive wheel velocity Vw to the target wheel velocity $V_{RP}$.

Figure 3:
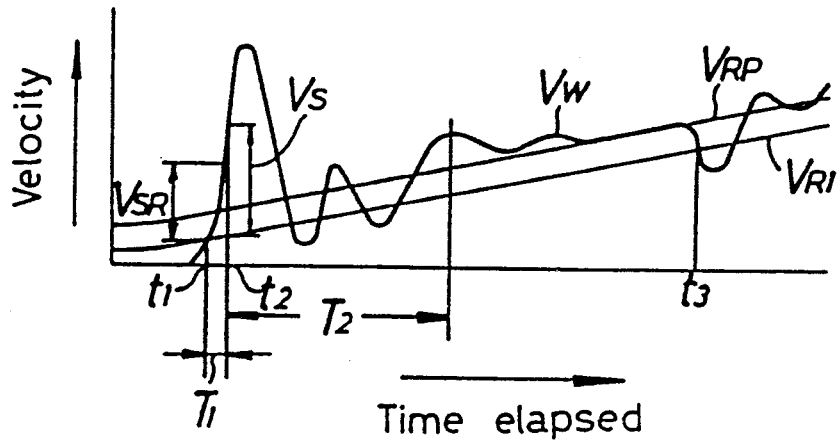
FIG. 3 is a graph illustrating variations in drive wheel velocity with lapse of time.

In this case, the clocking operation of the first timer 14 is started at the time $t_1$ when the drive wheel velocity Vw has exceeded the control acceptable velocity $V_{R1}$, as shown in FIG. 3, and the slipping state Vs at the instant when the time $T_1$ set in the first timer 14 has elapsed is held in the hold circuit 15 and compared with the threshold value $V_{SR}$ in the comparator circuit 16. When the result of comparison is small, i.e., when the slip value Vs is smaller than the threshold value $V_{SR}$, the output from the comparator circuit 16 is low, and the output from the flip-flop 19 is high. Therefore, a relative high gain is delivered from the higher gain determining circuit 23 into the gain input terminal of the PID calculating circuit 10 which effects the PID control on the basis of the inputted relatively high gain. Thus, a high responsive control of the torque of the drive wheel is carried out by the PID control on the basis of the relatively high gain.

When the result of comparison in the comparator circuit 16 is large, i.e., when the slip value Vs has exceeded the threshold value $V_{SR}$, the output from the comparator circuit 16 becomes high and the output from the flip-flop 19 is reset into the low level, from the judgment that a large disturbing factor has been applied. This causes the relatively low gain to be delivered from the lower gain determining circuit 24 to the gain input terminal of the PID calculating circuit 10 which then performs the PID control on the basis of the relatively low gain inputted thereto. Thus, a relatively low responsive control of the torque of the drive wheel is carried out by the PID control on the basis of the relatively low gain, and it is possible to avoid generation of any hunting which may otherwise occur due to a sensitive control upon the application of a large disturbing factor.

When the time $T_2$ has elapsed from the instant $t_2$ when the output from the comparator circuit 16 has become high, the output from the second timer 17 becomes high. When the drive wheel velocity Vw becomes equal to or less than the control-acceptable velocity $V_{R1}$ at an instant $t_3$ after lapse of the time $T_2$, the output from the AND circuit 18 becomes high and in response to this, the output from the flip-flop 19 becomes high, so that the relatively high gain from the higher gain determining circuit 23 is inputted to the gain input terminal G of the PID calculating circuit 10 and thus, the control is restored to the original high responsive control.

Until the time $T_2$ passes from the instant $t_2$, the output from the AND circuit 18 remains low, even if the output from the comparator circuit 9 has become low. The control cannot be restored to the original high responsive control, until a PID flip-flop control on the basis of the relatively low gain has been carried out to stabilize the drive wheel velocity Vw.

When a large disturbance has been applied as described above, the gain is reduced and the drive wheel torque decrement with respect to the slipping state of the drive wheel is reduced. Therefore, it is possible to avoid generation of any hunting in the control condition. Moreover, because the original control condition is restored after it has been decided that the drive wheel velocity Vw has been stabilized after extinguishment of the disturbance, it is possible to effect a good feedback control.

Although the gain in the PID feedback control is changed in the above embodiment, it will be understood that the present invention is applicable to a system in which the quantity of control of the drive wheel torque decrement is selected from a table in accordance with the deviation between the drive wheel velocity Vw and the target drive wheel velocity $V_{RP}$. In this case, the control quantity may be searched from a table in which the quantity of control of the drive wheel torque decrement is set smaller, based on a judgment that a large distrubance has been applied when the drive wheel slip value has become larger than the present value after lapse of a predetermined time from the instant when the drive wheel has become a predetermined slipping state.

What is claimed is:

1. A system for preventing an excessive slip of a drive wheel of a vehicle, comprising:
    a drive wheel velocity detector means for detecting a velocity of the drive wheel,
    a vehicle velocity detector means for detecting a velocity of the vehicle,
    a drive wheel slip value calculating means for calculating a slip value of the drive wheel on the basis of said drive wheel velocity and said vehicle velocity,
    a drive wheel torque decrement calculating means for calculating a torque decrement of the drive wheel in accordance with a slipping state of the drive wheel,
    a switchover means which produces a torque decrement switchover signal when the slip value of the drive wheel becomes larger than a preset value after the drive wheel has entered a predetermined slipping state, said switchover means including a first timer for clocking lapse of a predetermined time from an instant when the drive wheel has become the predetermined slipping state, thereby producing the torque decrement switchover signal when the slip value of the drive wheel become larger than the preset value after clocking of the predetermined time by said first timer, and a torque decrement changeover means which delivers, to the drive wheel torque decrement calculating means, a correcting signal indicative of a command to reduce a degree of relation of the drive wheel torque decrement with respect to the slipping state of the drive wheel in accordance with an output of the torque decrement changeover signal from said switchover means.

2. A system for preventing an excessive slip of a drive wheel of a vehicle, comprising:

a drive wheel velocity detector means for detecting a velocity of the drive wheel, a vehicle velocity detector means for detecting a velocity of the vehicle, a drive wheel slip value calculating means for calculating a slip value of the drive wheel on the basis of said drive wheel velocity and said vehicle velocity, a drive wheel torque decrement calculating means for calculating a torque decrement of the drive wheel in accordance with a slipping state of the drive wheel, a switchover means which produces a torque decrement switchover signal when the slip value of the drive wheel becomes larger than a preset value after the drive wheel has entered a predetermined slipping state, a torque decrement changeover means which delivers, to the drive wheel torque decrement calculating means, a correcting signal indicative of a command to reduce a degree of relation of the drive wheel torque decrement with respect to the slipping state of the drive wheel in accordance with an output of the torque decrement changeover signal from said switchover means, wherein said switchover means is arranged to deliver, to said torque decrement changeover means, a signal indicative of a command to restore said torque decrement changeover means to a state prior to outputting of the correcting signal therefrom in response to elimination of the predetermined slipping state of the drive wheel after outputting of the torque decrement changeover signal.

3. A system for preventing an excessive slip of a drive wheel of a vehicle according to claim 2, wherein said switchover means further includes a second timer for clocking lapse of a predetermined time from an instant when the torque decrement changeover signal has been outputted, and the outputting of said signal indicative of the command to restore said torque decrement changeover means to the state prior to said outputting of the correcting signal is suppressed during clocking of the predetermined time by said second timer.

4. A system for preventing an excessive slip of a drive wheel of a vehicle, comprising:

a drive wheel velocity detector means for detecting a velocity of the drive wheel, a vehicle velocity detector means for detecting a velocity of the vehicle, a drive wheel slip value calculating means for calculating a slip value of the drive wheel on the basis of said drive wheel velocity and said vehicle velocity, and a drive wheel torque decrement calculating means for calculating a torque decrement of the drive wheel in accordance with a slipping state of the drive wheel, wherein said drive wheel torque decrement calculating means includes a PID calculating means for calculating the drive wheel torque decrement on the basis of the slipping state of the drive wheel, and a gain switchover means is connected to said drive wheel torque decrement calculating means for switching a gain of the PID calculating means to a smaller value when the slip value of the drive wheel becomes larger than a preset value after the drive wheel has entered the predetermined slipping state.

* * * * *